(12) United States Patent
Sohn

(10) Patent No.: US 10,939,498 B2
(45) Date of Patent: Mar. 2, 2021

(54) WIRELESS MESH NETWORK-BASED LIGHTING DEVICE CONTROL METHOD USING MOBILE COMMUNICATION TERMINAL, AND COMPUTER READABLE RECORDING MEDIUM STORING PROGRAM FOR IMPLEMENTING SAME

(71) Applicant: SAMJIN LND Co., Ltd, Hwaseong-si (KR)

(72) Inventor: Choong-Yong Sohn, Cheongju-si (KR)

(73) Assignee: SAMJIN LND Co., Ltd, Hwaseong-si (KR)

( * ) Notice: Subject to any disclaimer, the term of this patent is extended or adjusted under 35 U.S.C. 154(b) by 0 days.

(21) Appl. No.: 16/675,808

(22) Filed: Nov. 6, 2019

(65) Prior Publication Data

US 2020/0077468 A1    Mar. 5, 2020

Related U.S. Application Data

(62) Division of application No. 15/754,215, filed as application No. PCT/KR2016/002602 on Mar. 16, 2016, now Pat. No. 10,701,760.

(30) Foreign Application Priority Data

Mar. 10, 2016   (KR) .......................... 10-2016-0028708

(51) Int. Cl.
   *H04W 4/00*        (2018.01)
   *H04W 84/18*       (2009.01)
   (Continued)

(52) U.S. Cl.
   CPC ............. *H04W 84/18* (2013.01); *H04W 4/80* (2018.02); *H05B 33/08* (2013.01); *H05B 47/10* (2020.01);
   (Continued)

(58) Field of Classification Search
   None
   See application file for complete search history.

(56) References Cited

U.S. PATENT DOCUMENTS 10,701,760 B2 *   6/2020   Sohn ..................... H04W 84/18
2011/0095687 A1   4/2011   Jonsson
(Continued)

FOREIGN PATENT DOCUMENTS

JP        2012-004062 A      1/2012
KR   10-2007-0001385 A       1/2007
(Continued)

OTHER PUBLICATIONS

International Search Report for International Application No. PCT/KR2016/002602 (3 pages) (dated Nov. 30, 2016).

*Primary Examiner* — Phuongchau Ba Nguyen
(74) *Attorney, Agent, or Firm* — Lucas & Mercanti, LLP

(57) ABSTRACT

The present invention provides a method for connecting a plurality of lighting devices installed in a predetermined indoor space and controlling the same on the basis of a wireless mesh network by using a mobile communication terminal of a user. The method includes: setting at least one lighting device selected from the plurality of lighting devices as a bridge control means and designating remaining lighting devices as a mesh network group; registering the lighting device set as the bridge control means and the lighting devices designated as the mesh network group; and accessing the lighting device registered as the bridge control means; and on the basis thereof, controlling operations of the lighting device set as the bridge control means and the lighting devices designated as the mesh network group.

5 Claims, 6 Drawing Sheets

(51) Int. Cl.
*H05B 47/10* (2020.01)
*H05B 47/19* (2020.01)
*H05B 33/08* (2020.01)
*H04W 4/80* (2018.01)
*H04L 12/28* (2006.01)
*H04W 84/12* (2009.01)

(52) U.S. Cl.
CPC ...... *H05B 47/19* (2020.01); *H04L 2012/2841* (2013.01); *H04W 84/12* (2013.01); *Y02B 20/30* (2013.01); *Y02B 20/40* (2013.01)

(56) References Cited

U.S. PATENT DOCUMENTS

| | | |
|---|---|---|
| 2013/0264943 A1 | 10/2013 | Bora et al. |
| 2014/0134954 A1* | 5/2014 | Ruan ........................ H04L 49/00 455/66.1 |
| 2020/0077467 A1* | 3/2020 | Sohn ........................ H05B 47/10 |

FOREIGN PATENT DOCUMENTS

| | | |
|---|---|---|
| KR | 10-0971548 B1 | 7/2010 |
| KR | 10-1270343 B1 | 5/2013 |
| KR | 10-2014-0006944 A | 1/2014 |
| KR | 10-2014-0023487 A | 2/2014 |
| KR | 10-2014-0103573 A | 8/2014 |
| KR | 10-2015-0050158 A | 5/2015 |
| KR | 10-2015-0107123 A | 9/2015 |

\* cited by examiner

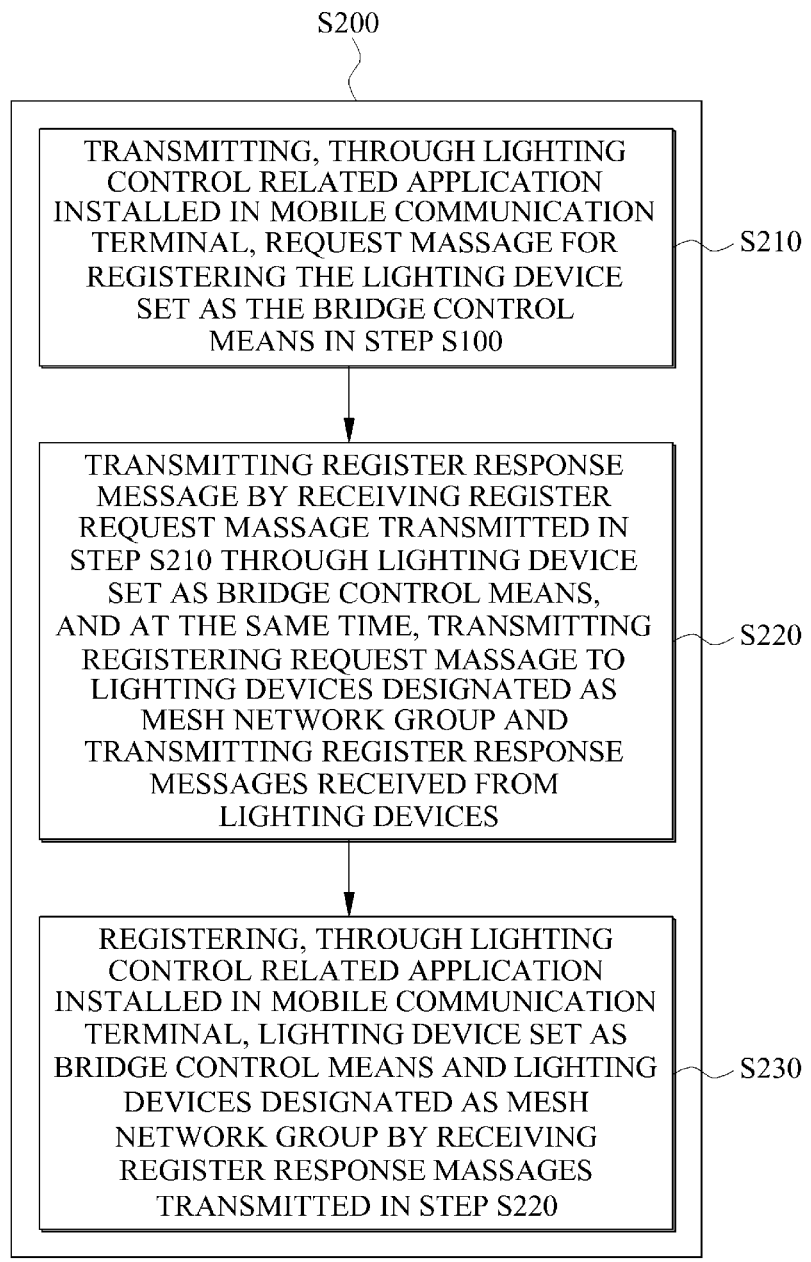

WIRELESS MESH NETWORK-BASED LIGHTING DEVICE CONTROL METHOD USING MOBILE COMMUNICATION TERMINAL, AND COMPUTER READABLE RECORDING MEDIUM STORING PROGRAM FOR IMPLEMENTING SAME

CROSS-REFERENCE TO RELATED APPLICATIONS

This application is a divisional application of U.S. patent application Ser. No. 15/754,215 filed Feb. 21, 2018, which is a U.S. national stage of PCT/KR2016/002602, filed Mar. 16, 2016, which in turn claims the benefit of priority from Korean Patent Application No. 10-2016-0028708 filed Mar. 10, 2016, the contents of each of which are incorporated herein by reference.

TECHNICAL FIELD

The present invention relates to a wireless mesh network-based lighting device control method using a mobile communication terminal, and a computer readable recording medium storing a program for implementing same.

BACKGROUND ART

In general, in a lighting control system, a lighting controller (for example, a wall controller, a remote controller, a sensor, a mobile or smart device, etc.) controls a plurality of lighting devices.

Herein, the lighting controller wirelessly controls a plurality of lighting devices through an independent wireless mesh network (WMN). For this, each lighting device is connected to the wireless mesh network of the lighting controller.

Herein, the lighting controller implements the wireless mesh network by using at least one wireless channel having a good channel state among accessible wireless channels. Accordingly, in order to connect to the wireless mesh network, each lighting device determines a channel having the best channel state among accessible wireless channels.

In other words, in the above lighting control system, the lighting controller selects a lighting device having the best signal state among a plurality of lighting devices connected to a wireless mesh network (WMN) as a bridge, and completes a connection with the bridge.

Then, the lighting controller communicates with the lighting device designated as the bridge, and controls the plurality of lighting devices connected to the wireless mesh network through the bridge.

However, in the above lighting control system, there are difficulties in selecting a single lighting device among a plurality of lighting devices as a bridge, and completing the connection. In other words, since an allowed frequency resource is limited, the failure rate is high the when the lighting controller confirms a connection by receiving a connection response, and a connection delay time increases due to repeated connection request. Thus, user dissatisfaction grows. As a number of lighting devices increases, a connection failure rate and delay time also increases. Accordingly, efficiency of the lighting control system is degraded.

DISCLOSURE

Technical Problem

Accordingly, the present invention has been made keeping in mind the above problems occurring in the prior art, and an object of the present invention is to provide a wireless mesh network-based lighting device control method using a mobile communication terminal, and a computer readable recording medium storing a program for implementing same, the method being capable of easily connecting and controlling a plurality of lighting devices based on a wireless mesh network (WMN) by using a lighting control related application pre-installed in a mobile communication terminal of a user, and efficiently controlling the plurality of lighting devices based on the wireless mesh network by minimizing a bridge connection delay time and maximizing a connection success rate.

Technical Solution

In order to accomplish the above object, according to a first aspect of the present invention, there is provided a wireless mesh network-based lighting device control method using a mobile communication terminal, wherein the method connects and controls a plurality of lighting devices installed in a predetermined indoor space based on a wireless mesh network by using a mobile communication terminal of a user, the method including: step a of setting, through a lighting control related application installed in the mobile communication terminal, at least one lighting device selected form the plurality of lighting devices as a bridge control means, and designating remaining lighting devices as a mesh network group; step b of registering, through the lighting control related application installed in the mobile communication terminal, the lighting device set as the bridge control means, and the lighting devices designated as the mesh network group in step a; and step c of controlling, through the lighting control related application installed in the mobile communication terminal, operations of the lighting device set as the bridge control means and the lighting devices designated as the mesh network group by accessing the lighting device set as the bridge control means and registered in step b and based thereon.

Herein, it is preferable for the step a to include: step a-1 of being provided with, through the lighting control related application installed in the mobile communication terminal, unique identification information and signals for bridge setting which are transmitted from the plurality of lighting devices; and step a-2 of setting, through the lighting control related application installed in the mobile communication terminal, a lighting device having a maximum signal strength as the bridge control means by analyzing strengths of the signals provided in the step (a-1), and designating remaining lighting devices as the mesh network group.

Preferably, the step b may include: step b-1 of transmitting, through the lighting control related application installed in the mobile communication terminal, a register request message to the lighting device set as the bridge control means in step a; step b-2 of transmitting a register response message by being provided with the register request message transmitted in step b-1 through the lighting device set as the bridge control means, and at the same time, transmitting the register request messages to the lighting devices designated as the mesh network group, and being provided with and transmitting register response messages from the lighting devices designated as the mesh network group; and step b-3 of registering, through the lighting control related application installed in the mobile communication terminal, the lighting device set as the bridge control means and the lighting devices designated as the mesh network group by being provided with the register response messages transmitted in step b-2.

Preferably, in the step b-1, through the lighting control related application installed in the mobile communication terminal, the register request messages may be transmitted to the lighting devices designated as the mesh network group in step a, and then, the lighting devices designated as the mesh network group may be registered by being provided with the register response messages thereof.

Preferably, in step a, when a lighting control means installed in the predetermined indoor space for manually or automatically controlling at least one lighting device is further included, through the lighting control related application installed in the mobile communication terminal, the method primarily may set the lighting control means as a main bridge control means by being provided with unique identification information and a bridge set signal transmitted from the lighting control means, change the lighting device set as the bridge control means to be set as an auxiliary bridge control means, and designate the plurality of lighting devices as the mesh network group.

Preferably, through the lighting control related application installed in the mobile communication terminal, the lighting device set as the auxiliary bridge control means may be changed to be set as the main bridge control means when a failure occurs in the lighting control means set as the main bridge control means or an access thereto is failed.

Preferably, the lighting control means may be configured with at least one of a wall controller, a remote controller, a sensor module, and a switch module for lighting controlling.

Preferably, the sensor module may include at least one of a luminance sensor, a temperature sensor, a humidity sensor, a piezoelectric sensor, a gyro sensor, a pressure sensor, a proximity sensor, a microwave sensor, and a human body sensing sensor.

Preferably, the switch module may be configured to transmit preset unique identification information and a signal for bridge setting or releasing according to a switching operational state of a switch that is additionally provided to be connected to each lighting device.

Preferably, the method may further include: after the step a, step of transmitting, through the lighting control related application installed in the mobile communication terminal, to the lighting device set as the bridge control means bridge setting information data including information for registering and controlling the lighting devices designated as the mesh network group.

Preferably, through the lighting device set as the bridge control means, the bridge setting information data transmitted from the lighting control related application of the mobile communication terminal may be stored in an additional memory.

Preferably, in the step a, through the lighting control related application installed in the mobile communication terminal, a service in which a plurality of areas is set according to a movement path of the mobile communication terminal may be provided, and a service in which at least one lighting device selected from a plurality of lighting devices arranged in each area is set as a main bridge control means of each area, and remaining lighting devices are designated as a mesh network group of each area may be provided.

Preferably, each of the lighting devices set as the main bridge control means of each area may designate a neighbor lighting device having a maximum wireless signal strength within a distance of arrival of an nearby antenna as an auxiliary bridge control means, and transmit information of the designated lighting device to lighting control related application installed in the mobile communication terminal, and when a failure occurs in lighting device set as the main bridge control means of each area or an access thereto is failed, through the lighting control related application installed in the mobile communication terminal, the lighting device set as the auxiliary bridge control means of each area may be changed to be set as the main bridge control means of each area.

Preferably, wherein in the step a, when a qualification permission signal for bridge setting is transmitted to at least one lighting device arranged at a preset bridge designation position among the plurality of lighting devices installed in the predetermined indoor space and a response signal thereof is received, through the lighting control related application installed in the mobile communication terminal, the lighting device arranged at the corresponding bridge designation position may be set as the bridge control means.

Preferably, when the lighting device arranged at the bridge designation position is in plural, qualification permission signals for bridge setting may be transmitted to respective lighting devices, strengths of response signals thereof may be analyzed, and a lighting device having a maximum signal strength may be set as the bridge control means.

Preferably, the preset bridge designation position may be at least one of at least one first bridge designation position corresponding to an end point of each corner, at least one second bridge designation position corresponding to a middle point between corners, and a third bridge designation position corresponding to a central point of the entire second bridge designation position Preferably, in the step a, through the lighting control related application installed in the mobile communication terminal, when a service in which at least one lighting device of the plurality of lighting device is selected by a user is provided, and a qualification permission signal for bridge setting is transmitted to the lighting device selected by the corresponding user and a response signal thereof is received, the lighting device selected by the corresponding user may be set as the bridge control means.

Preferably, when the lighting device selected by the corresponding user is plural, qualification permission signals for bridge setting may be transmitted to respective lighting devices, strengths of response signals thereof may be analyzed, and a lighting device having a maximum signal strength may be set as the bridge control means.

Preferably, the method may further include, after the step b, step of transmitting, register information data of the lighting device set as the bridge control means and the lighting devices designated as the mesh network group which are registered in the step b through the lighting control related application installed in the mobile communication terminal to an additional lighting management sever connected through a communication network.

Preferably, the method may further include step of building, through the lighting management server, the lighting devices designated as the mesh network group in a database based on the lighting device set as the bridge control means and which is transmitted from the lighting control related application installed in mobile communication terminal, and storing and managing the same.

According to a second aspect of the present invention, there is provided a computer readable recording medium storing a program, the program being capable of executing the above wireless mesh network-based lighting device control method using the mobile communication terminal.

A wireless mesh network-based lighting device control method using a mobile communication terminal according to the present invention may be implemented as a computer readable code on a computer readable recording medium. The computer-readable recording medium includes any recording device on which data readable by a computer system is recorded.

For example, the computer-readable recording medium includes a ROM, a RAM, a CD ROM, a magnetic tape, a hard disk, a floppy disk, a removable storage device, a nonvolatile memory (Flash Memory), an optical data storage device, etc.

Advantageous Effects

As described above, according to a wireless mesh network-based lighting device control method using a mobile communication terminal, and a computer readable recording medium storing a program for implementing same of the present invention, a plurality of lighting devices based on a wireless mesh network (WMN) can be easily connected and controlled by using a lighting control related application pre-installed in a mobile communication terminal of a user, and the plurality of lighting devices based on the wireless mesh network can be efficiently controlled by minimizing a bridge connection delay time and maximizing a connection success rate.

DESCRIPTION OF DRAWINGS

FIG. 6 is a view showing a flowchart for illustrating a step S200 of registering the lighting device of FIG. 4 in detail.

BEST MODE

Figure 1:
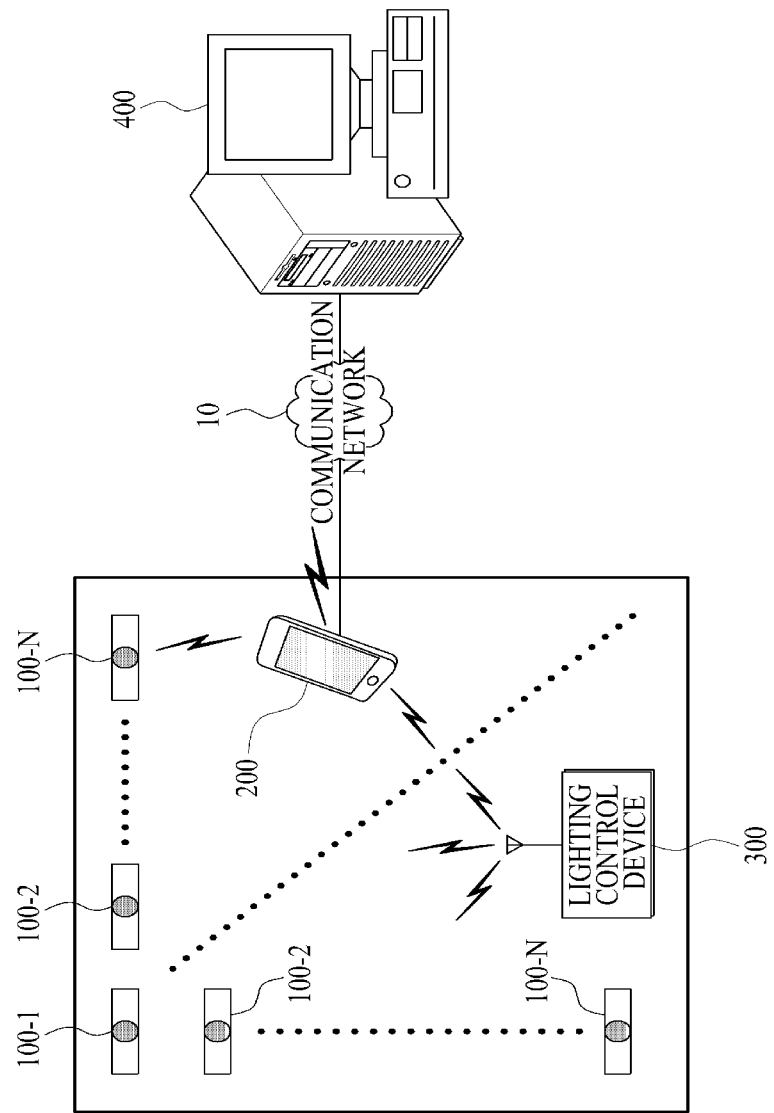
FIG. 1 is a view showing an entire block configuration diagram showing a system for implementing a method of controlling a lighting device based on a wireless mesh network using a mobile communication terminal according to an embodiment of the present invention.

The objects, features and advantages of the invention will appear more fully upon consideration of the illustrative embodiments now to be described in detail with the accompanying drawings. Accordingly, the technological concepts of the present invention can be easily understood by one skilled in the art. In addition, the detailed description of known techniques relating to the present invention will be omitted so as not to obscure the gist of the invention.

While terms including ordinal numbers, such as "first", "second", etc., may be used to describe various components, such components are not limited by the above terms. The above terms are used only to distinguish one component from another. For example, a first component may be referred to as a second component without departing from the scope of the present invention, and likewise, a second component may be referred to as a first component. The terms used in this application are used to merely describe the particular embodiments and are not intended to limit the present invention. Expressions of the singular numbers include the expressions of the plural numbers unless they are obviously differently expressed in the context.

All terms including descriptive or technical terms which are used herein should be construed as having meanings that are obvious to one of ordinary skill in the art. However, the terms may have different meanings according to an intention of one of ordinary skill art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

The terms "include (or including)" or "comprise (or comprising)" are inclusive or open-ended and does not exclude additional, un-recited elements or method steps. "Unit", "module", "block", etc. used herein each represent a unit for handling at least one function or operation, and may be implemented in hardware, software, or a combination thereof.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. The embodiments of the present invention are provided to describe the present invention more clearly to those skilled in the art.

Combinations of blocks in the accompanying block diagrams or steps in the accompanying flowcharts can be executed by computer program instructions (execution engine), and the computer program instructions can be mounted in a processor of a general-use computer, special-use computer or other programmable data processing equipment. Thus, the instructions executed through the processor of the computer or other programmable data processing equipment generate units for performing functions described in the respective blocks of the block diagrams or the respective steps of the flowcharts. The computer program instructions can be stored in a computer usable or readable memory oriented to a computer or other programmable data processing equipment, in order to implement functions in a specific method. Thus, the instructions stored in the computer usable or readable memory can be used to manufacture products including instruction units for performing the functions described in the respective blocks of the block diagrams or the respective steps of the flowcharts.

As described above, the computer program instructions can be mounted in the computer or other programmable data processing equipment. Therefore, instructions which generate processes by performing a series of operation steps on the computer or other programmable data processing equipment and operate the computer or other programmable data processing equipment can provide steps for executing the functions described in the respective blocks of the block diagrams and the respective steps of the flowcharts.

Each of the blocks or steps may indicate a part of a module, segment or code including one or more executable instructions for executing specific logical functions. In some substitutions, the functions described in the blocks or steps can be performed out of sequence. That is, two blocks or steps can be operated or performed substantially at the same time, and the blocks or steps can be operated or performed in the reverse order of the corresponding function.

Figure 2:
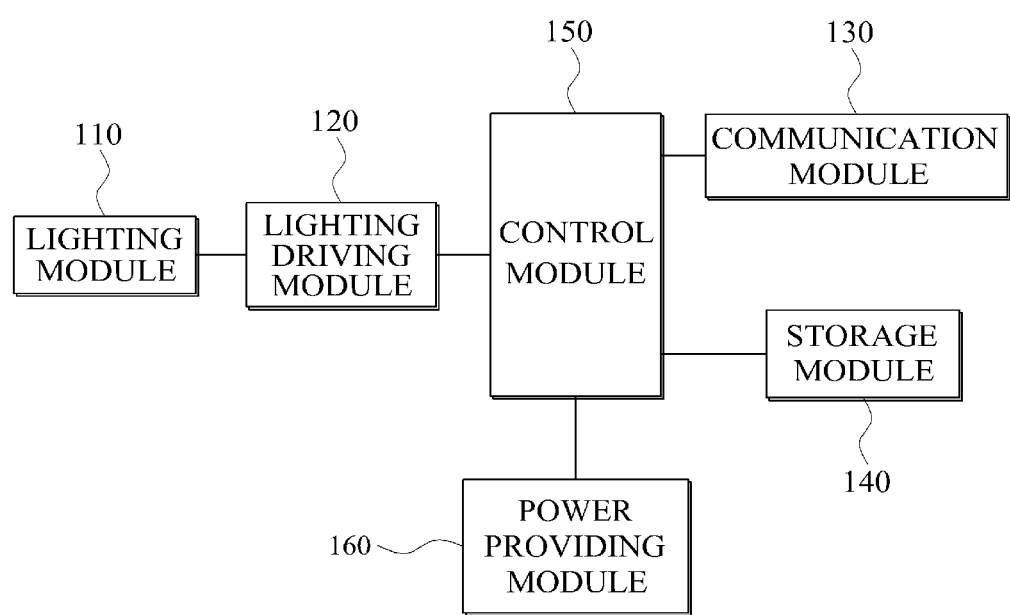
FIG. 2 is a view showing an entire block configuration diagram for illustrating the lighting device applied to an embodiment of the present invention.
Figure 3:
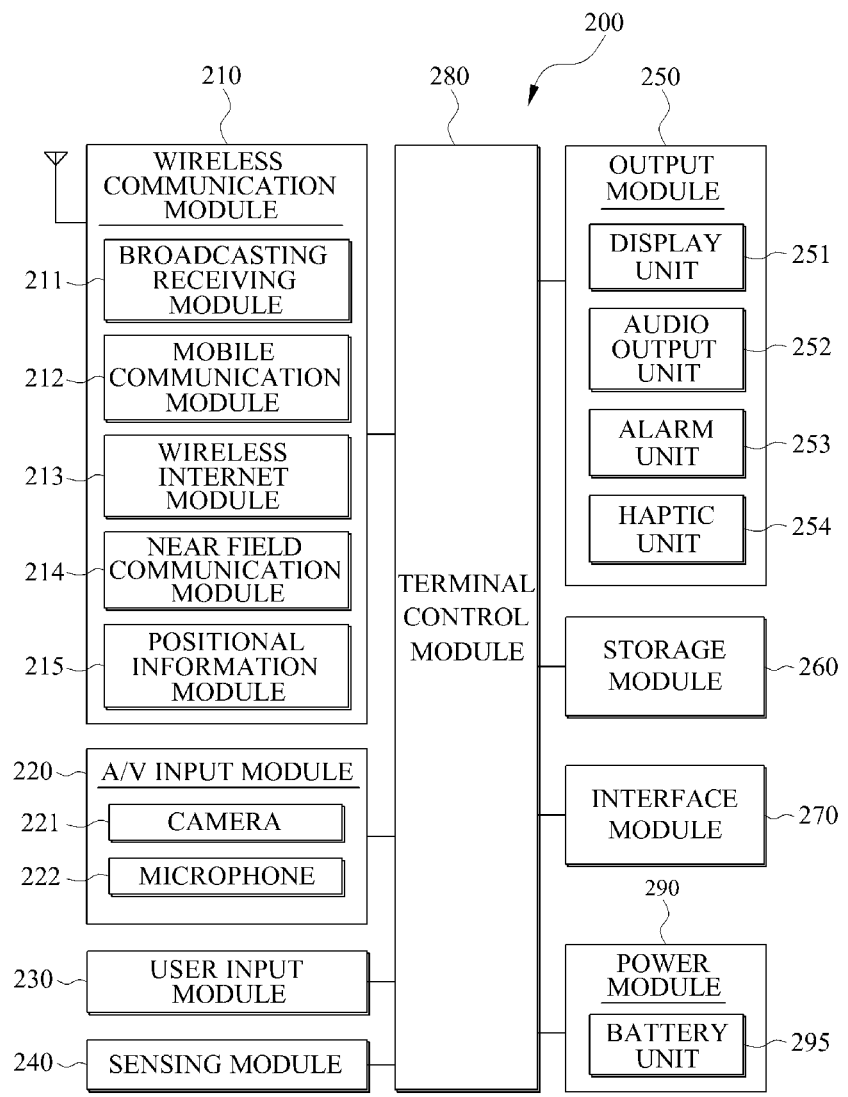
FIG. 3 is a view showing a detailed block configuration diagram for illustrating the mobile communication terminal applied to an embodiment of the present invention.

FIG. 1 is a view showing an entire block configuration diagram showing a system for implementing a wireless mesh network-based lighting device controlling method using a mobile communication terminal according to an embodiment of the present invention, FIG. 2 is a view showing an entire block configuration diagram for illustrating the lighting device applied to an embodiment of the present invention, and FIG. 3 is a view showing a detailed block configuration diagram for illustrating the mobile communication terminal applied to an embodiment of the present invention.

Referring to FIGS. 1 to 3, a system for implementing a wireless mesh network-based lighting device controlling method using a mobile communication terminal according to an embodiment of the present invention is implemented by including a plurality of lighting devices 100-1 to 100-N, and a mobile communication terminal 200. In addition, the system for implementing the wireless mesh network-based lighting device controlling method using the mobile communication terminal according to an embodiment of the present invention may further include a lighting control device 300 used as a lighting control means for controlling the plurality of lighting devices 100-1 to 100-N.

Herein, each of the plurality of lighting devices 100-1 to 100-N is a device installed in a predetermined indoor space and emitting light, and includes, as shown in FIG. 2, a lighting module 110, a light driving module 120, a communication module 130, a storage module 140, a control module 150, and a power providing module 160. Meanwhile, configuration elements shown in FIG. 2 are not essential, and each lighting device 100-1 to 100-N may include more or fewer components.

Herein, the lighting module 110 is a module generating light according to driving power applied from the light driving module 120. The lighting module 110 may be a module emitting various lights, but it is not limited to that kind. For example, the lighting module 110 may include at least one of a light emitting diode (LED) lamp that is a semiconductor element emitting light, a fluorescent lamp, an incandescent lamp, a halogen lamp, a neon tube lamp, a sodium lamp, a metalhalide lamp, and a electro-luminescent lamp, but it is not limited thereto.

The light driving module 120 applies driving power to the lighting module 110 by adjusting a brightness of light and a wavelength of light of the lighting module 110 according to a control command signal of the control module 150. The light driving module 120 may adjust a light amount by adjusting a current when the lighting module 110 is an LED, but it is not limited thereto.

The communication module 130 is a module that performs wired or wireless communication or both for respective lighting devices 100-1 to 100-N. The communication module 130 may communicate with at least one of respective lighting devices 100-1 to 100-N, the mobile communication terminal 200 and the lighting control device 300, and includes a wireless transmitter performing frequency-up conversion and amplification for a transmitting signal, and a wireless receiver performing low-noise amplification and frequency-down conversion for a received signal.

It is preferable for the above communication module 130 to be implemented in a wireless mesh network (WMN) by using a predetermined low power wireless personal area network (WPAN), but it is not limited thereto. For example, the wireless mesh network may be implemented by using, in addition to a wireless Internet communication method, such as wireless LAN (WLAN)(Wi-Fi), wireless broadband (Wibro), world interoperability for microwave access (Wimax), high speed downlink packet access (HSDPA), WiFi, etc., a near field wireless communication method such as Bluetooth communication, Beacon communication, ZigBee communication, ultra wideband (UWB) communication, radio frequency identification (RFID) communication, infrared data association (IrDA) communication, etc., but it is not limited to any one communication method.

The storage module 140 may include a program memory and a data memory. The program memory stores programs controlling general operations of respective lighting devices 100-1 to 100-N. Herein, the program memory may store a program for connecting to the mesh network configured by mobile communication terminal 200 or lighting control device 300 or both.

In addition, the program memory may store a program for driving the lighting module 110 under a control of the mobile communication terminal 200 or lighting control device 300 or both. The data memory stores data generated while performing programs for respective lighting devices 100-1 to 100-N. In the above data memory, for example, device information, channel information, frequency information, and network group information, etc. may be stored.

In addition, in the data memory of the storage module 140, unique identification information of respective lighting devices 100-1 to 100-N may be stored. For example, it is preferable for the unique identification information of respective lighting devices 100-1 to 100-N to include any one piece of information of a device name, a device password, a device serial number, a device type, a device manufacture, a device media access control (MAC) address, a device unique Internet protocol (IP) address, device model and version, a device secret key, a device authentication information generated by a personal key based on a PKI, but it is not limited thereto, and all identification types of information identifying a device may be included.

In other words, in the storage module 140, at least one program code executed by the control module 150, and at least one data set used by the program code may be stored and maintained.

The above storage module 140 may include, for example, at least one readable storage medium type of a flash memory type, a hard disk type, a multimedia card micro type), a card type memory (for example, SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The control module 150 is a module controlling overall operations of the respective lighting devices 100-1 to 100-N, and performs various functions for the respective lighting devices 100-1 to 100-N, and executes or performs various software programs or instruction groups or both which are stored in the storage module 140 for data processing. In other words, the control module 150 may process various signals based on information stored in the storage module 140.

In addition, the control module 150 may receive various signals from the communication module 130. In other words, the control module 150 may perform various calculations based on the various signals received from the communication module 130.

In addition, the control module 150 is connected to the wireless mesh network configured by the mobile communication terminal 200 or the lighting control device 300 or both. In addition, the control module 150 drives the lighting module 110 through the light driving module 120 under a control of the mobile communication terminal 200 or the lighting control device 300 or both.

The power providing module 160 provides necessary power to the respective modules which are the lighting module 110, the light driving module 120, the communication module 130, the storage module 140, and the control module 150. In order to provide continuous power, it is preferable to be implemented to convert commercial AC power (for example, AC 220V) to DC power or AC power or both. However, it is not limited thereto, it may be implemented by using a conventional portable battery.

In addition, the mobile communication terminal 200 may be connected to a remote lighting management server 400 through a communication network 10. In addition, the mobile communication terminal 200 may be connected to the respective lighting devices 100-1 to 100-N or the lighting control device 300 or both through the communication network 10 or near filed communication or both.

Herein, it is preferable to implement the communication network 10 by using an Ethernet or a mobile communication network, or the communication network 10 may be a communication network of a high speed backbone network of a large communication network being able to perform a large-scale service, or may be an Internet or a next-generation wireless communication network including Wi-Fi, WiGig, wireless broadband Internet (Wibro), or world interoperability for microwave access (Wimax) for providing a high-speed multimedia service.

The Internet refers to a worldwide open computer network structure providing transmission control protocol/internet protocol (TCP/IP) and various services of upper layers, such as hypertext transfer protocol (HTTP), telnet, file transfer protocol (FTP), domain name system (DNS), simple mail transfer protocol (SMTP), simple network management protocol (SNMP), network file service (NFS) and network information service (NIS), and provides an environment allowing the mobile communication terminal 200 to be connected to at least one of the respective lighting devices 100-1 to 100-N, the lighting control device 300 and the light management sever 400. Meanwhile, the Internet may be the wired or wireless Internet or a core network combined with a wired public network, a wireless mobile communication network, the mobile Internet, etc.

When the communication network 10 is a mobile communication network, it may be a synchronous or asynchronous mobile communication network. In an embodiment, the asynchronous mobile communication network may be a communication network of wideband code division multiple access (WCDMA). Herein, although it is not shown in the figure, the mobile communication network may include a radio network controller (RNC). Meanwhile, although a WCDMA network is described as an example, the mobile communication network may be a next generation network, such as a 3G LTE network, a 4G network or the like, or other IP networks based on IP. The communication network 10 performs a function of transferring signals and data between the mobile communication terminal 200 and at least one of the respective lighting devices 100-1 to 100-N, the lighting control device 300, and the light management server 400.

In addition, for example, the mobile communication terminal 200 may perform a lighting control related application service by downloading a lighting control related application program that provides a lighting control management service from an app store or the light management server 400.

In addition, by using the lighting control related application service installed in the mobile communication terminal 200, at least one lighting device selected from the plurality of lighting devices 100-1 to 100-N may be set as a bridge control means and remaining lighting devices may be designated to a mesh network group.

In addition, by using the lighting control related application service installed in the mobile communication terminal 200, the lighting device selected as the bridge control means and the lighting devices designated as the mesh network group may be registered.

In addition, by using the lighting control related application service installed in the mobile communication terminal 200, operations of the lighting device registered as the bridge control means and the lighting devices designated as the mesh network group may be controlled by connecting to the lighting device registered as the bridge control means and based thereon.

Meanwhile, it is preferable to configure the mobile communication terminal 200 with a mobile terminal apparatus of at least one a smart phone, a smart pad, and a smart note which communicate through wireless Internet or mobile Internet. In addition, the mobile communication terminal 200 may mean overall wired wireless home/communication apparatuses including an interface for connecting to at least one of the respective lighting devices 100-1 to 100-N), the lighting control device 300, and the light management server 400 such as palm PC, mobile play-station, and digital multimedia broadcasting (DMB) phone, tablet PC, or iPad which include communication functions.

The above mobile communication terminal 200, as shown in FIG. 3, may include a wireless communication module 210, an A/V (Audio/Video) input module 220, a user input module 230, a sensing module 240, an output module 250, a storage module 260, an interface module 270, a terminal control module 280, and a power module 290. Meanwhile, configuration elements shown in FIG. 3 are not essential, and the mobile communication terminal 200 may include more or fewer configuration elements.

Hereinafter, configuration elements of the mobile communication terminal 200 will be described in detail.

The wireless communication module 210 may include at least one module that enables wireless communication between the mobile communication terminal 200 and a wireless communication system (for example, respective lighting devices 100-1 to 100-N, lighting control device 300, light management server 400, other management server, etc.). For example, the wireless communication module 210 may include a broadcast receiving module 211, a mobile communication module 212, a wireless internet module 213, a near field communication module 214, and a positional information module 215.

The broadcasting receiving module 211 receives a broadcast signal (for example, TV broadcasting signal, radio broadcasting signal, data broadcasting signal, etc.) or broadcast associated information or both from an external broadcast management server via various broadcasting channels (for example, satellite channel, terrestrial channel, etc.).

The mobile communication module 212 transmits and receives radio signals to and from at least one of a base station, an external terminal or a server over a mobile communication network. The radio signals may include voice call signals, video telephony call signals or data in various forms according to the transmission and reception of text or multimedia messages or both.

The wireless Internet module 213 refers to a module for wireless Internet access. The wireless Internet module 113 may be internally or externally coupled to the mobile communication terminal 200. As technologies for wireless Internet, for example, WLAN (wireless LAN), Wi-Fi, Wibro, Wimax, high speed downlink packet access (HSDPA), and long term evolution (LTE) may be used.

The near field communication module 214 is a module for near field communication. As technologies for near field communication, Bluetooth communication, ZigBee communication, ultra wideband (UWB) communication, radio frequency identification (RFID) communication, and infrared data association (IrDA) communication may be used.

The positional information module 215 is a module for checking and obtaining a position of the mobile communication terminal 200, and current position information of the mobile communication terminal 200 may be obtained by using a global position system (GPS), etc.

The A/V (audio/video) input module 220 is a module for receiving an audio or video signal, and includes a camera 221 and a microphone 222. The camera 221 processes image frames of still pictures or video obtained by an image sensor in a photographing mode or a video telephony mode. The microphone 222 receives an external audio signal through a microphone during a phone call mode, a recording mode, a voice recognition mode, etc, and processes the receives signal to electrical voice data.

The user input module 230 is a module that generates input data for a user to control operation of the mobile communication terminal 200. The user input module 230 may be configured to include, for example, a keypad, a dome switch, a touchpad (static pressure or static capacitance), a jog wheel, a jog switch, etc.

The sensing module 240 detects a current status of the mobile communication terminal 200 such as an open/closed state of the mobile communication terminal 200, a position of the mobile communication terminal 200, presence of a user's contact, a touch operation of the user with respect to a particular part, orientation of the mobile communication terminal 200, and acceleration or deceleration of the mobile communication terminal 200, etc., and generates a sensing signal for controlling operation of the mobile communication terminal 200. The sensing signal is transmitted to terminal control module 280 and used by the terminal control module 280 to perform a particular function.

The output module 250 is a module for generating output related to visual, auditory, and tactile sense, and may include a display unit 251, an audio output unit 252, an alarm unit 253, and a haptic unit 254.

The display unit 251 displays information processed by the mobile communication terminal 200. For example, when the mobile communication terminal 200 is in a call mode, the display unit 251 may display a user interface (UI) or a graphic user interface (GUI) associated with the call. When the mobile communication terminal 200 is in a video communication mode or a photograph mode, the display unit 251 may display at least one of captured and received pictures, a UI, and a GUI.

The audio output unit 252 may output, for example, audio data received from the wireless communication module 210 or stored in the storage module 260 during a call-receiving mode, a communication mode, a recording mode, a voice recognition mode, or a broadcasting receiving mode.

The alarm unit 253 may output a signal for notifying occurrence of a particular event associated with the mobile communication terminal 200. Events occurring in the mobile communication terminal 200 may be a call signal reception, a message reception, a key signal input, a touch input, etc.

The haptic unit 254 generates various tactile effects that may be sensed by the user. Vibration is a representative tactile effect generated by the haptic unit 254. Strength and pattern of a vibration generated in the haptic unit 254 may be controlled.

The storage module 260 may store programs for operation of the control module 180, and temporarily store input/output data (for example, a phonebook, a message, a still picture, a moving picture, etc). The storage module 260 may store data about vibration and sound of various patterns output when the user touches the touch screen.

The storage module 260 may include at least one type of storage media from among a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The interface module 270 performs the role of a passage to all kinds of external devices connected to the mobile communication terminal 200. The interface unit 270 receives data or power from an external device and delivers the received data or power to individual elements within the mobile communication terminal 200, or transmits data from the mobile communication terminal 200 to an external device.

The terminal control module 280 generally controls the overall operation of the mobile communication terminal 100. For example, the terminal control module 280 performs control and processing related to voice calls, data communication, video calls, etc.

In addition, the terminal control module 280 may continuously monitor a charging current and a charging voltage of a battery unit 295, and temporarily store the monitored value in the storage module 260. Herein, it is preferable for the storage module 260 to store, in addition to battery charging status information such as monitored charging current and charging voltage, battery capacity information (production code, rating, etc.).

The power module 290 receives internal and external power by the control of the terminal control module 280, and provides power required for operating various components for the mobile communication terminal 200. The power module 290 operates to provide power of the battery unit 295 integrated therein to respective configuration elements, and the battery unit may be charged through a charging terminal (not shown).

Various embodiments of the present invention described in this document may be implemented within a recording medium that can be read by a computer or a device similar thereto by using software, hardware, or a combination thereof.

As for hardware implementation, embodiments of the present invention can be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing functions. In some cases, the embodiments may be implemented by the terminal control module 280.

In the case of software implementation, embodiments of the present invention related to a procedure or a function can be implemented with a separate software module which enables at least one function or operation to be carried out. Software codes may be implemented by a software application written in a suitable programming language. Also, the software codes can be stored in the storage module 260 and executed by the terminal control module 280.

Meanwhile, when the mobile communication terminal 200 is configured with a smart phone it will be understood that the smartphone is an open-operating-system-based phone in which a user may freely download, use, and delete a variety of desired application programs, unlike a general cell phone (namely, a feature phone), and may be a communication device including a mobile phone having a mobile office function in addition to functions such as voice/video calls, Internet data communication, etc. or any Internet phone or tablet PC which can access the Internet but does not have a voice call function.

The above smartphone may be implemented as a smartphone with an open operating system. Examples of the open operating system include Nokia's Symbian, RIM's BlackBerry, Apple's iOS, Microsoft's Windows Mobile, Google's Android, and Samsung's Bada.

Accordingly, since the smartphone use an open operating system unlike a cellular phone having a closed operating system, a user may install and manage various application programs.

In other words, the above-described smartphone basically includes a control unit, a memory unit, a screen output unit, a key input unit, a sound output unit, a camera unit, a wireless network communication module, a near field wireless communication module, and a battery for supplying power.

The control unit is a functional element for controlling an operation of the smartphone, and includes at least one process and an execution memory, which are connected with each functional element included in the smartphone through a BUS.

The above control unit controls an operation of the smartphone by loading at least one program code included in the smartphone to the execution memory through the processor, performing calculation, and delivering a result of the calculation to at least one functional element through the bus.

The memory unit is a non-volatile memory included in the smartphone, and stores at least one program code that is executed through the control unit and at least one data set that is used by the program code. Basically, the memory unit stores a system program code and a system data set that correspond to an operating system of the smartphone, a communication program code and a communication data set that process a wireless communication connection of the smartphone, and at least one application program code and application data set. The program code and the data set that are used to implement the present invention are also stored in the memory unit.

The screen output unit includes a screen output device (for example, a liquid crystal display (LCD) device) and an output module for driving the screen output device and is connected with the control unit through the bus to output a calculation result corresponding to a screen output among various calculation results of the control unit to the screen output device.

The key input unit includes a key input device (or a touch screen device that interoperates with the screen output unit) having at least one key button and an input module for driving the key input device and is connected with the control unit through the bus to input commands for instructing various calculations of the control unit or data that is needed for the operations of the control unit.

The sound output unit includes a speaker for outputting a sound signal and a sound module for driving the speaker, and is connected with the control unit through the bus to output a calculation result corresponding to a sound output among various calculation results of the control unit through the speaker. The sound module decodes sound data to be output through the speaker, and converts the decoded sound data into a sound signal.

The sound input unit includes a microphone for receiving a sound signal and a sound module for driving the microphone and delivers sound data that is received through the microphone to the control unit. The sound module encodes a sound signal that is received through the microphone.

The camera unit includes an optical unit, a charge coupled device (CCD), and a camera module for driving the CCD, and acquires bitmap data that is input to the CCD through the optical unit. The bitmap data may include both of still image data and moving image data.

The wireless network communication module is a communication element for enabling wireless communication, includes at least one of an antenna, an RF module, a baseband module, and a signal processing module, and is connected with the control unit through the bus to transmit a calculation result corresponding to the wireless communication among the various calculation results of the control unit, or maintain access, registration, communication, and handoff procedures of the wireless communication while receiving data through the wireless communication to transmit the received data to the control unit.

In addition, the wireless network communication module includes a mobile communication element that performs at least one of access to a mobile communication network, position registration, call processing, call connection, data communication, and a handoff according to code division multiple access (CDMA)/wideband code division multiple access (WCDMA) standards. It will be understood by a person skilled in the art that the wireless network communication module may further include a mobile Internet communication element for performing at least one of the access to mobile Internet, the position registration, the data communication, and the handoff according to IEEE 802.16 standards. However, it is apparent that the present invention is not limited to wireless communication elements that are provided by the wireless network.

The near field wireless communication module is configured to establish a communication session using a radio frequency signal within a certain distance as a communication medium, and may include at least one of a RFID communication, Bluetooth communication, wireless fidelity (Wi-Fi) communication, and public radio communication in ISO 180000 series standards. In addition, the near field wireless communication module may be integrated with the wireless network communication module.

The smartphone having the above-described configuration is a terminal capable of wireless communications. Any device other than the smartphone may be applied as long as the device is a terminal that may transmit or receive or both data over a network including the Internet. In other words, the smartphone may include at least one of a notebook PC, a tablet PC, and other portable and mobile terminals, which have a short message sending function and a network access function.

The lighting control device 300 is installed in a predetermined indoor space. The lighting control device 300 is a device for manually or automatically controlling the plurality of lighting devices 100-1 to 100-N, and may be configured with, for example, at least one of a wall controller, a remote controller, a sensor module, and a switch module.

Herein, it is preferable for the sensor module to include at least one of, for example, a illuminance sensor sensing surrounding brightness, a temperature sensor sensing surrounding temperature, a humidity sensor sensing surrounding humidity, a piezoelectric sensor, a gyro sensor, a pressure sensor, a proximity sensor sensing whether or not an object approaches, a microwave sensor, and a human body sensing sensor, and a proper sensor may be selected and applied according to an installation object such as lighting.

Herein, the temperature sensor is a sensor for sensing temperature in the air, and a thermistor element whose internal resistance value changes with an ambient temperature change may be used. The thermistor element may be an NTC thermistor, a PTC thermistor, or a critical characteristic (CRT) thermistor.

It is preferable to configure the above temperature sensor with a contact type temperature sensor using the thermistor element. However, it is not limited thereto, for example, it may be configured with a thermo couple sensor, a bimetal sensor, an IC temperature sensor, a IR sensor that is a non contact type sensor, etc.

The humidity sensor is a sensor for sensing humidity in the air, and generally senses the humidity by using the change in electrical properties of the humidity-sensitive material due to moisture.

The above humidity sensor is classified into a resistance type humidity sensor and a capacitance type humidity sensor, and is widely applied to, in addition to home appliances and mobile devices, autos, medical devices, air cleaning systems, automatic air conditioning and heating systems for optimization thereof.

The resistance type humidity sensor measures humidity by using changes in resistance that occurs by the humidity. The resistance type humidity sensor is widely used than the capacitance type humidity sensor since the resistance type has better price competitiveness.

However, recently, as the capacitive humidity sensor is manufactured in a one-chip form on a semiconductor substrate, the price competitiveness thereof has become superior to that of the resistance type humidity sensor. Accordingly, the use thereof is increasing. Particularly, the capacitance type humidity sensor is more reliable than the resistance type humidity sensor, and has a linear sensor characteristic and is affected little by temperature.

The above capacitance type humidity sensor is a sensor using a principle in which a capacitance changes according to a water molecular weight that is adsorbed on a humidity sensing film, and is operated in a capacitor form using as a dielectric material a humidity sensing material such as polyimide or ceramic in which dielectric constant thereof changes by absorbing moisture. In other words, when a humidity sensing film sensing humidity is present, a capacitance is changed according to changes in dielectric constant by moisture absorbed on the humidity sensing film.

The microwave sensor is a sensor using a Doppler radar principle. Particularly, the microwave sensor may be used in harsh environments having high heat, temperature, noise, moisture, air current, dust, etc., since a malfunction of the microwave sensor occurs at a low rate, a sensing distance thereof is large and a sensing angle (orientation angle) thereof is 120 degrees to 130 degrees. The microwave sensor may perform sensing by passing through glass, plaster board, etc. Accordingly, it is a proper sensor for controlling lighting devices according to the present invention.

The human body sensing sensor is a sensor for sensing a human body, and may be configured with, for example, at least one combination of a ultrasonic wave sensor, an IR sensor, a image sensor, a laser sensor, and a temperature sensor.

In addition, the switch module is installed to be connected to each of the lighting devices 100-1 to 100-N and may be configured to transmit preset unique identification information and a signal for bridge setting and releasing according to a switching operational state of a switch that is additionally provided.

Meanwhile, in order to effectively register and control the plurality of lighting devices configured as the wireless mesh network (WMN) from the at least one of the mobile communication terminal 200, the lighting control device 300, and the light management server 400, the lighting device set as the bridge control means or the lighting control device 300 performs the role of data intermediating at least one of the mobile communication terminal 200, the lighting control device 300, the light management server 400, and the plurality of lighting devices configured as the wireless mesh network (WMN).

Figure 4:
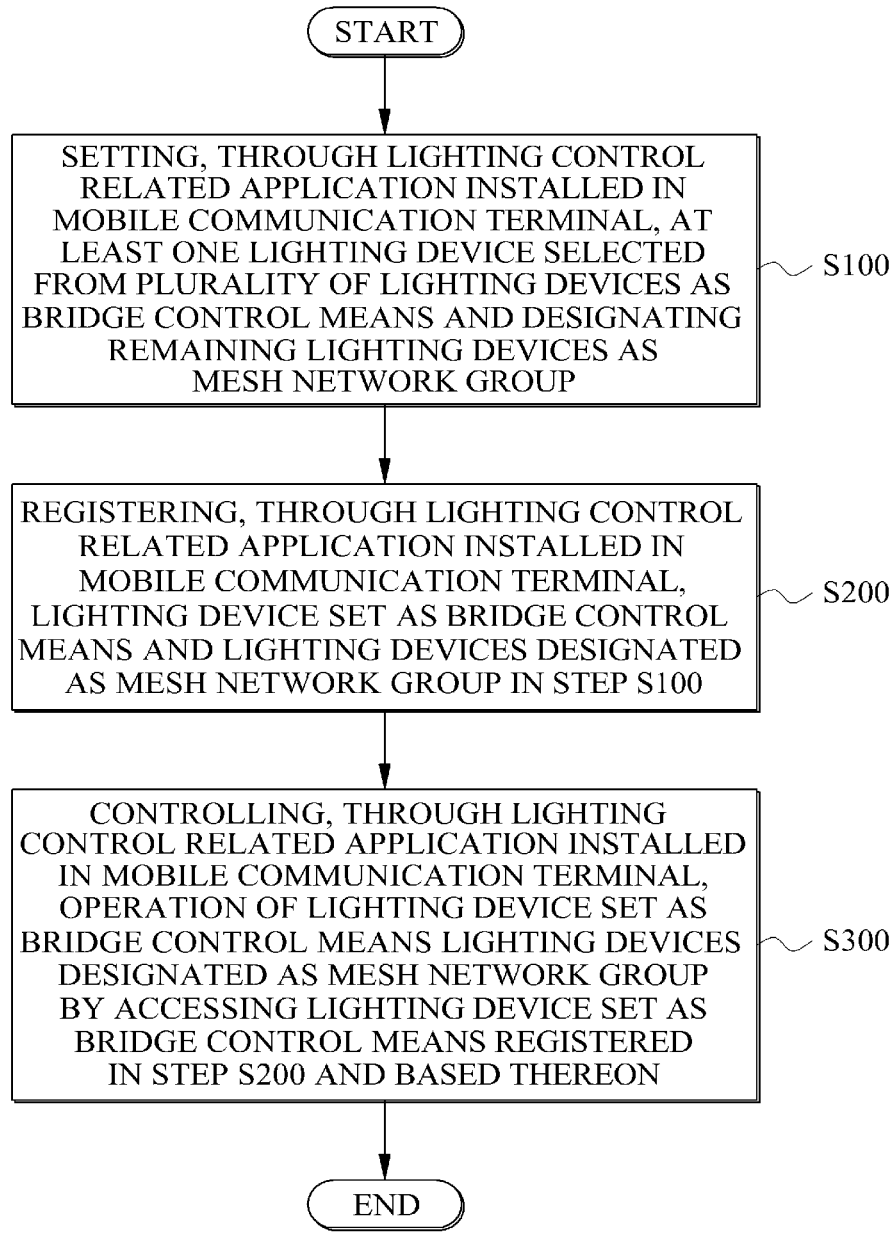
FIG. 4 is a view showing the entire flowchart for illustrating a method of controlling a lighting device based on a wireless mesh network using a mobile communication terminal according to an embodiment of the present invention.
Figure 5:
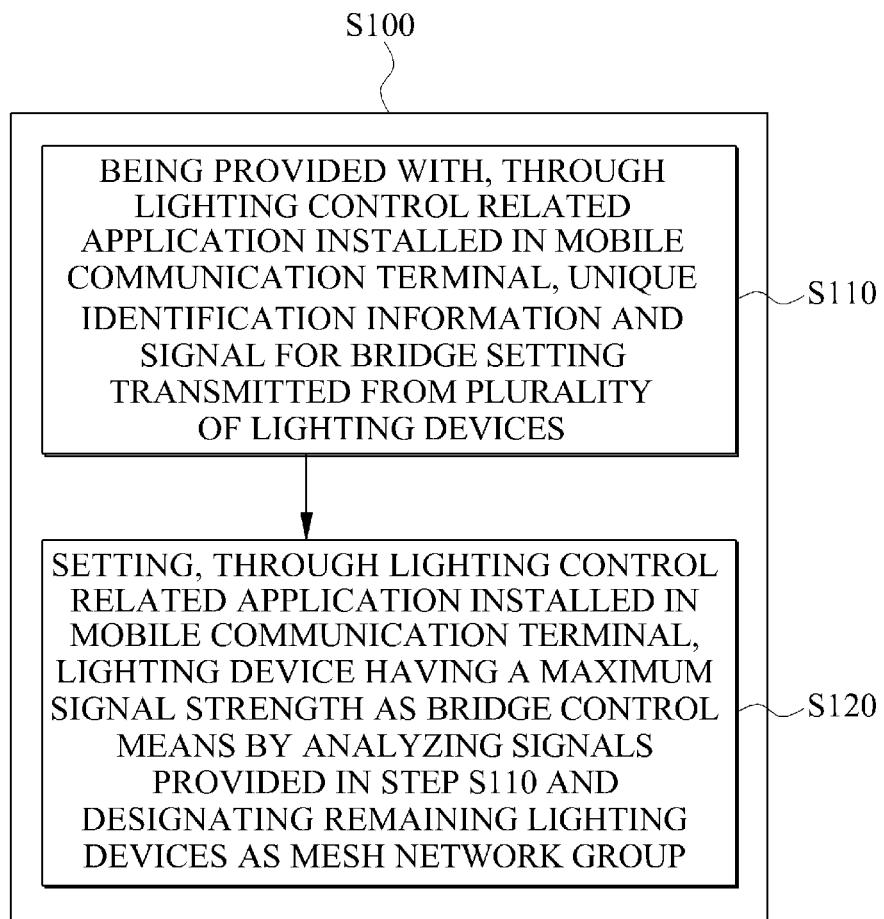
FIG. 5 is a view showing a flowchart for illustrating a step S100 of setting a bridge control means of FIG. 4 in detail.

FIG. 4 is a view showing the entire flowchart for illustrating a method of controlling a lighting device based on a wireless mesh network using a mobile communication terminal according to an embodiment of the present invention, FIG. 5 is a view showing a flowchart for illustrating a step S100 of setting a bridge control means of FIG. 4 in detail, and FIG. 6 is a view showing a flowchart for illustrating a step S200 of registering the lighting device of FIG. 4 in detail.

Referring to FIGS. 1 to 6, in the method of controlling the lighting device based on the wireless mesh network using the mobile communication terminal according to an embodiment of the present invention, first, in step S100, at least one lighting device selected from a plurality of lighting devices 100-1 to 100-N is set as a bridge control means, and remaining lighting devices are designated as a mesh network group by using a lighting control related application installed in the mobile communication terminal 200.

Herein, it is preferable for the step S100, as shown in FIG. 5, to include step S110 of receiving unique identification information transmitted from the plurality of lighting devices 100-1 to 100-N and a signal for bridge setting through the lighting control related application installed in the mobile communication terminal 200, and step S120 of setting a lighting device having a maximum signal strength as the bridge control means by analyzing strengths of signals received in step S110, and designating the lighting devices as the mesh network group through the lighting control related application installed in the mobile communication terminal 200.

Meanwhile, in step S100, when a lighting control device 300 that is a light control means installed in the predetermined indoor space for manually or automatically controlling at least one of the lighting devices 100-1 to 100-N is further provided, through the lighting control related application installed in the mobile communication terminal 200, a main bridge control means is primarily set by being provided with the unique identification information and the signal for bridge setting transmitted from the lighting control device 300, the lighting device set as the bridge control means in step S100 is set as an auxiliary bridge control means, and the plurality of lighting devices 100-1 to 100-N is designated as the mesh network group.

Herein, through the lighting control related application installed in the mobile communication terminal 200, it is preferable to set that the lighting device set as the auxiliary bridge control means is changed to the main bridge control means when failure or access error occurs in the lighting control device 300 set as the main bridge control means.

Particularly, in step S100, through the lighting control related application installed in the mobile communication terminal 200, a service in which a plurality of areas is set according to a movement path of the corresponding mobile communication terminal 200 may be provided, the service may be provided in that at least one lighting device selected from a plurality of lighting devices 100-1 to 100-N which is arranged in each area is set as a main bridge control means, and remaining lighting devices are designated as a mesh network group for each area.

Herein, it is preferable for each of the lighting devices that are set the main bridge control means for respective areas to designate as an auxiliary bridge control means of each area a neighbor lighting device having a maximum signal strength within a distance of arrival of an antenna nearby, to transmit information of the designated lighting device to the lighting control related application installed in the mobile communication terminal 200 so that when a failure occurs in the lighting device set as the bridge control means of each area or an access thereto fails, the lighting device designated as the auxiliary bridge control means of each area is set as the main bridge control means of each area through the lighting control related application installed in the mobile communication terminal 200.

In addition, in step S100, through the lighting control related application installed in the mobile communication terminal 200, a qualification permission signal for bridge setting may be transmitted to at least one lighting device arranged at a preset bridge designation position among the plurality of lighting devices 100-1 to 100-N installed in the predetermined indoor space, when a response signal thereof is received, the lighting device arranged at the corresponding bridge designation position may be set as the bridge control means.

Herein, when the lighting device arranged at the bridge designation position is provided in plural, it is preferable to transmit a qualification permission signal for bridge setting to each lighting device, to analyze strengths of signals received as response thereof, and to set the lighting device having a maximum signal strength as the bridge control means.

Meanwhile, it is preferable for the preset bridge designation position to be, for example, at least one of at least one first bridge designation position corresponding to an end point of each corner within the predetermined indoor space, at last one second bridge designation position corresponding to a middle point between corners, and a third bridge designation position corresponding to a center point of all second bridge designation position within the predetermined indoor space.

In addition, in step S100, through the lighting control related application installed in the mobile communication terminal 200, a service may be provided that enabling a user to select at least one lighting device among the plurality of lighting devices 100-1 to 100-N. A qualification permission signal for bridge setting may be transmitted to the lighting device selected by the corresponding user, and when a response signal thereof is received, the lighting device selected by the corresponding user may be set as the bridge control means.

Herein, when the lighting device selected by the corresponding user is plural, it is preferable to transmit a qualification permission signal for bridge setting to each lighting device, to analyze strengths of signals received as response thereof, and to set the lighting device having a maximum signal strength as the bridge control means.

Then, in step S200, through the lighting control related application installed in the mobile communication terminal 200, the lighting device set as the bridge control means and the lighting devices designated as the mesh network group in step S100 are registered.

Herein, in step S200, as shown in FIG. 6, through the lighting control related application installed in the mobile communication terminal 200, it is preferable to include step S210 of transmitting a request massage for registering the lighting device set as the bridge control means, step S220 of transmitting a registration response message by receiving the registering request massage transmitted in step S210 through the lighting device set as the bridge control means, and at the same time, transmitting the registering request massage to the lighting devices designated as the mesh network group and transmitting register response messages received from the lighting devices, and step S230 of registering, through the lighting control related application installed in the mobile communication terminal 200, the lighting device set as the bridge control means and the lighting devices designated as the mesh network group by receiving the register response massages transmitted in step S220.

In addition, in step S210, through the lighting control related application installed in the mobile communication terminal 200, the register request message may be transmitted to the lighting devices designated as the mesh network group in step S100, and then the lighting devices designated as the mesh network group may be registered by receiving the register response message therefrom.

Then, in step S300, through the lighting control related application installed in the mobile communication terminal 200, operations of the lighting device set as the lighting device and the lighting devices designated as the mesh network group are controlled by accessing to the lighting device set as the bridge control means and registered in step S200 and based thereon.

Additionally, after step S100, through the lighting control related application installed in the mobile communication terminal 200, the step of transmitting bridge setting information including information for registering and controlling the lighting device set as the bridge control means and the lighting devices designated as the mesh network group may be further included.

In addition, through the lighting control related application installed in the mobile communication terminal 200, the bridge setting information transmitted from the lighting control related application of the mobile communication terminal 200 may be stored in an additional memory by being provided with the same.

In addition, after step S200, through the lighting control related application installed in the mobile communication terminal 200, step of transmitting register information data of the lighting device set as the bridge control means and the lighting devices designated as the mesh network group which are registered in step S200 to the additional light management server 400 connected through the communication network 10 may be further included.

In addition, through the light management server 400, the step of building the lighting devices designated as the bridge control means as a database based on the lighting device set as the bridge control means and which is transmitted from the lighting control related application installed in the mobile communication terminal 200 and storing and managing the same may be included.

Meanwhile, the method of controlling the lighting device using the mobile communication terminal based on the wireless mesh network according to an embodiment of the present invention may be implemented as a program code recorded in a computer-readable recording medium. The computer-readable recording medium may include all types of storage devices on which computer-readable data can be stored.

For example, the computer-readable recording medium may be read-only memory (ROM), random access memory (RAM), compact disc ROM (CD-ROM), magnetic tape, a floppy disc, an optical data storage device, etc. Also, a carrier wave (i.e., transmission through internet) may be included as the computer-readable recording medium.

Also, the computer-readable recording medium may be distributed over computer systems connected through wire or wireless communication networks, and the computer-readable program code can be stored and executed in the distributive manner.

A preferred embodiment of the above described wireless mesh network-based lighting device control method using a mobile communication terminal according to an embodiment of the present invention and a computer readable recording medium storing a program for implementing the same has been described, but the present invention is not limited thereto. It will be understood by those skilled in the art that various changes in form and details may be made therein without departing from the spirit and scope of the invention as defined by the appended claims.

INDUSTRIAL APPLICABILITY

The present invention may be widely used in the field of controlling a lighting device based on a wireless mesh network

The invention claimed is:

1. A wireless mesh network-based lighting device control method using a mobile communication terminal, wherein the method connects and controls a plurality of lighting devices installed in a predetermined indoor space based on a wireless mesh network by using a mobile communication terminal of a user, the method comprising:
   step (a) of setting, through a lighting control related application installed in the mobile communication terminal, at least one lighting device selected from the plurality of lighting devices as a bridge control means, and designating remaining lighting devices as a mesh network group;
   step (b) of registering, through the lighting control related application installed in the mobile communication terminal, the lighting device set as the bridge control means, and the lighting devices designated as the mesh network group in step (a); and
   step (c) of controlling, through the lighting control related application installed in the mobile communication terminal, operations of the lighting device set as the bridge control means and the lighting devices designated as the mesh network group by accessing the lighting device set as the bridge control means and registered in step (b) and based thereon,
   wherein in the step (a), when a qualification permission signal for bridge setting is transmitted to at least one lighting device arranged at a preset bridge designation position among the plurality of lighting devices installed in the predetermined indoor space and a response signal thereof is received, through the lighting control related application installed in the mobile communication terminal, the lighting device arranged at the corresponding bridge designation position is set as the bridge control means.

2. The method of claim 1, wherein when the lighting device arranged at the bridge designation position is in plural, qualification permission signals for bridge setting are transmitted to respective lighting devices, strengths of response signals thereof are analyzed, and a lighting device having a maximum signal strength is set as the bridge control means.

3. The method of claim 1, wherein the preset bridge designation position is at least one of at least one first bridge designation position corresponding to an end point of each corner, at least one second bridge designation position corresponding to a middle point between corners, and a third bridge designation position corresponding to a central point of the entire second bridge designation position.

4. A wireless mesh network-based lighting device control method using a mobile communication terminal, wherein the method connects and controls a plurality of lighting devices installed in a predetermined indoor space based on a wireless mesh network by using a mobile communication terminal of a user, the method comprising:
   step (a) of setting, through a lighting control related application installed in the mobile communication terminal, at least one lighting device selected from the plurality of lighting devices as a bridge control means, and designating remaining lighting devices as a mesh network group;
   step (b) of registering, through the lighting control related application installed in the mobile communication terminal, the lighting device set as the bridge control means, and the lighting devices designated as the mesh network group in step (a); and
   step (c) of controlling, through the lighting control related application installed in the mobile communication terminal, operations of the lighting device set as the bridge control means and the lighting devices designated as the mesh network group by accessing the lighting device set as the bridge control means and registered in step (b) and based thereon,
   wherein in the step (a), through the lighting control related application installed in the mobile communication terminal, when a service in which at least one lighting device of the plurality of lighting device is selected by a user is provided, and a qualification permission signal for bridge setting is transmitted to the lighting device selected by the corresponding user and a response signal thereof is received, the lighting device selected by the corresponding user is set as the bridge control means.

5. The method of claim 4, wherein when the lighting device selected by the corresponding user is plural, qualification permission signals for bridge setting are transmitted to respective lighting devices, strengths of response signals thereof are analyzed, and a lighting device having a maximum signal strength is set as the bridge control means.

* * * * *